(12) United States Patent
Iacovino et al.

(10) Patent No.: US 6,967,948 B2
(45) Date of Patent: Nov. 22, 2005

(54) OUT-OF-BAND SIGNALLING APPARATUS AND METHOD FOR AN OPTICAL CROSS CONNECT

(75) Inventors: Giovanni Iacovino, Dollard-des-Ormeaux (CA); Patrice Mayer, St-Columban (CA); Yannick Dansereau-Daoust, St.-Therese (CA)

(73) Assignee: Ciena Corporation, Linthicum, MD (US)

( * ) Notice: Subject to any disclaimer, the term of this patent is extended or adjusted under 35 U.S.C. 154(b) by 195 days.

(21) Appl. No.: 10/284,652

(22) Filed: Oct. 31, 2002

(65) Prior Publication Data

US 2004/0085954 A1 May 6, 2004

(51) Int. Cl.$^7$ ............................................. H04Q 11/00
(52) U.S. Cl. ...................................... 370/384; 398/50
(58) Field of Search ............................. 370/217, 218, 370/219, 220, 373, 377, 384, 385, 410, 522, 524; 398/19, 30, 33, 45, 49, 50, 56, 57, 135, 136

(56) References Cited

U.S. PATENT DOCUMENTS

| | | | | |
|---|---|---|---|---|
| 5,452,306 A | * | 9/1995 | Turudic et al. | ............. 370/465 |
| 6,137,800 A | * | 10/2000 | Wiley et al. | ............ 370/395.51 |
| 6,172,977 B1 | * | 1/2001 | Christie et al. | ........ 370/395.61 |
| 2001/0056512 A1 | * | 12/2001 | Mok et al. | ................... 710/100 |

OTHER PUBLICATIONS

Notification of Transmittal of the International Search Report or the Declaration, dated Jun. 4, 2004, for PCT/US03/33196.

* cited by examiner

Primary Examiner—Wellington Chin
Assistant Examiner—John Shew
(74) Attorney, Agent, or Firm—Birch, Stewart, Kolasch & Birch, LLP

(57) ABSTRACT

A signaling architecture for a cross connect switch utilizes out-of-band communications channels to transmit status information from line modules to the switch module. The out-of-band communication channels are separate from the in-band payload data connections routinely used to connect line modules to the switch module. A framer is used to extract payload data for transmission on the in-band payload data connections. The framer also extracts status information that may be encoded before sending to the switch module via the out-of-band communications channels. The switch module logically pairs STS-1s into working/protect pairs and utilizes the STS-1 granular status information to decide which of the pair is a better copy which is output as the working copy after the cross-connect switch fabric is configured according to user demands. A redundant switch module may also be used for equipment protection.

15 Claims, 9 Drawing Sheets

OUT-OF-BAND SIGNALLING APPARATUS AND METHOD FOR AN OPTICAL CROSS CONNECT

BACKGROUND OF THE INVENTION

1. Field of Invention

The invention generally relates to optical cross connects. More specifically, the invention relates to signaling architectures and methods in an optical cross connect.

2. Description of Related Art

Switches are provided in communication networks in order to direct traffic to a desired destination. As the use of networks has increased over time, so has the need for more bandwidth. Fiber optic networks were developed to meet this need and transmit data (e.g., voice and data signals) at high data rates. The American-based Synchronous Optical Network ("SONET") standard and the corresponding European equivalent standard, Synchronous Data Handling ("SDH"), are examples of two industry standards developed for the transmission of data over such fiber optic mediums. For simplicity the remaining description of optical-based networks will focus upon the SONET standard. However, those skilled in the art will recognize that the concepts as they pertain to SONET are also applicable to SDH and other data transmission protocols.

In a SONET-based network data is transmitted as a series of multiplexed time slots or frames. The lowest data rate transmission typically within a SONET network is at a base rate of 51.84 Mbit/second, which in the electrical domain is referred to as a synchronous transport signal—level one ("STS-1") frame, and in the optical domain corresponds to an Optical Carrier—level 1 ("OC-1") frame.

Higher data rate frames can be formed from integer multiples of STS-1s, and are designated as STS-N/OC-N with N being a value, such as 3, 12, 48, 192, etc. For example, an OC-3 transmission is three times the base rate of OC-1.

As seen in FIG. 1, an OC-48 signal, when converted to corresponding electrical signals, includes 48 STS-1 frames. Each STS-1 frame is transmitted during a respective time slot, and comprises two components: a transport overhead and a payload. The transport overhead is provided in 9 rows of three bytes each (27 bytes total), and carries administrative information used by network elements to manage the transfer of the frame through the network. The payload, referred to as the Synchronous Payload Envelope ("SPE"), is provided in 9 rows of 87 bytes each (783 bytes total) and comprises the major portion of an STS-1. The SPE carries payload and STS Path Overhead ("STS POH") bytes, and may begin at any byte location within the payload envelope, as indicated by a pointer value in the overhead.

As mentioned above, each STS-1 segment includes a payload section and an overhead section. The overhead includes K-bytes that communicate error conditions between spans in a network and allow for link recovery after network failure. K-byte signaling takes place over the protection lines. In a series of STS segments, only K-bytes from the first STS-1 segment are used to carry error data. Current SONET networks make no use of the framing overhead of the remaining STS-1 segments. The series of STS-1 segments only carries K-byte error information for a single ring.

The B1 byte is a single interleaved byte used to provide error monitoring on the previous STS-n. B1 is also known as BIP-8 and stands for bit-interleaved parity. It performs even-parity checking on the previous STS-n frame in the SONET stream. This byte is only defined in the first STS-1 within an STS-n. B1 is a Section overhead byte.

The B3 is a Path overhead byte. It is analogous to the B3 (i.e. BIP-8) but is calculated over the previous SPE prior to scrambling.

SONET networks often have a ring configuration including a collection of nodes forming a closed loop. FIG. 2 illustrates an example of a conventional SONET bidirectional ring 100 whereby information may flow in either a clockwise or counterclockwise in the figure, as indicated by arrows labeled "working" and "protect". Add-drop multiplexers (A/D mux) 110, 120, 130 and 140 add and/or drop signals to switch data from one span (SP1 to SP7) to another. Ring 100 is thus termed a "bidirectional line switched ring" or BLSR, and data transmitted in such a ring typically must conform to a particular protocol.

As further shown in FIG. 2, each of spans SP1 to SP7 includes one working line and a corresponding protection line. For example, spans SP1 and SP5 interconnect A/D muxes 110 and 120 and include working lines carrying data in opposite directions. The working lines within each of these spans further include respective protection lines for transmitting data in the event the associated working line fails.

The SONET ring provides protection for transmission of data in two ways. First if a working lines fails, the corresponding protection lines may be used. In the alternative, if working lines fail between two A/D muxes, any communication route directed through the failed line may be rerouted through the A/D muxes through a process known as span switching. For example, if the working lines between A/D mux 110 and A/D mux 120 fail, instead of using the corresponding protection lines, communications may be sent from A/D mux 110 to A/D mux 120 via A/D mux 140 and 130.

Typically, the working and protect lines are provided in a fiber optic bundle. Accordingly, if the working line fails, due to a fiber cut, for example, the corresponding protect line often will also fail. Span switching is thus often preferred to simply switching data from the faulty working line to the protect line (also known as "1+1 protection"). Both schemes may be used in conjunction with each other, however, whereby an attempt is first made to use the protect line when the associated working line fails, and then, if the protection line is itself faulty, span switching is used to redirect communications.

To provide protection switching, SONET equipment must be able to monitor incoming signals and make decisions based on the quality of the signal. The quality of the signal is generally derived from standard SONET error conditions. These can include LOS (Loss Of Signal), LOF (Loss of Frame), LOP (Loss of Pointer), K1, K2, B1, and/ or B3 bytes etc. K1, K2 bytes are specifically defined as APS (Automatic Protection Switching) bytes and provide this function at the Line and Section level. B1, B3 are parity indicators to detect signal deterioration.

When the first SONET rates (OC-1,OC3 etc) where first implemented, protection schemes where implemented at the Line and Section level. The Path layer held the same amount of information as the Line and Section layer. Basically the envelope was just as big as the contents. Now that SONET technology has grown to must faster rates (OC-48, OC-192), the envelop has many packages in them. Since it is rare that one customer uses a complete OC-192 or OC-48, these rates are generally used as a result of aggregation of the slower rates. Thus, carriers are now faced with large SONET pipes and various protection requirements for each of the sub STS-n frames incorporated in those pipes.

These new requirements from carriers have now spawned the development of cross connects that support large bandwidths but can yet protect down to the STS-1 level. One problem generated by such requirements is that conventional architectures used for automatic protection switching can no longer be implemented that satisfy these requirements. This is due to the fact that these conventional architectures are generally software-intensive and thus increasing the capacity by two orders of magnitude would require the same increase in processing power. This would increase the cost of microprocessors running the APS software considerably and thereby make the systems too expensive and unmarketable.

The invention described herein provides a unique cost-effective solution to these problems.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
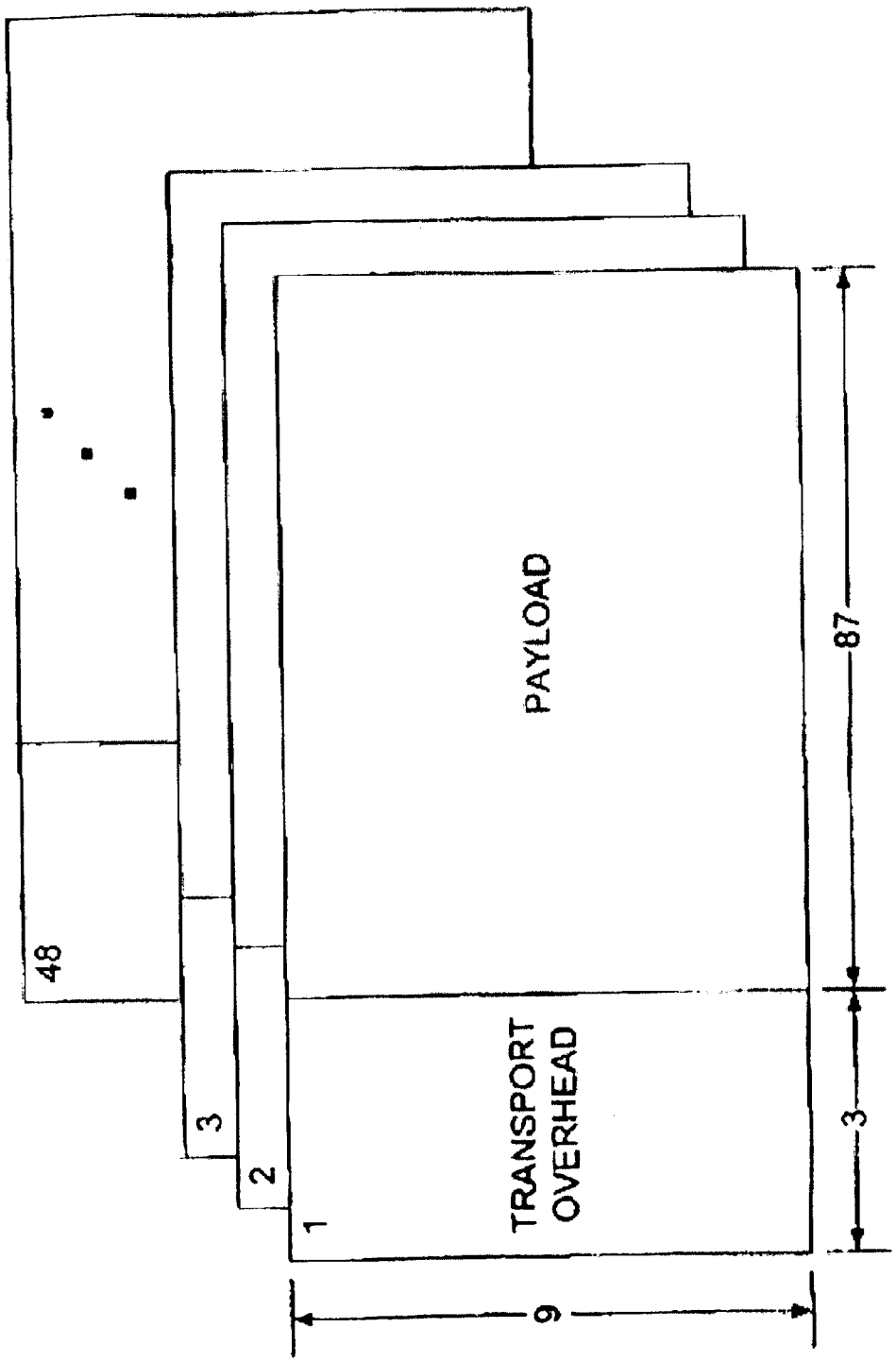
FIG. 1 is a diagram illustrating a conventional SONET frame structure for an OC-48 signal.
Figure 2:
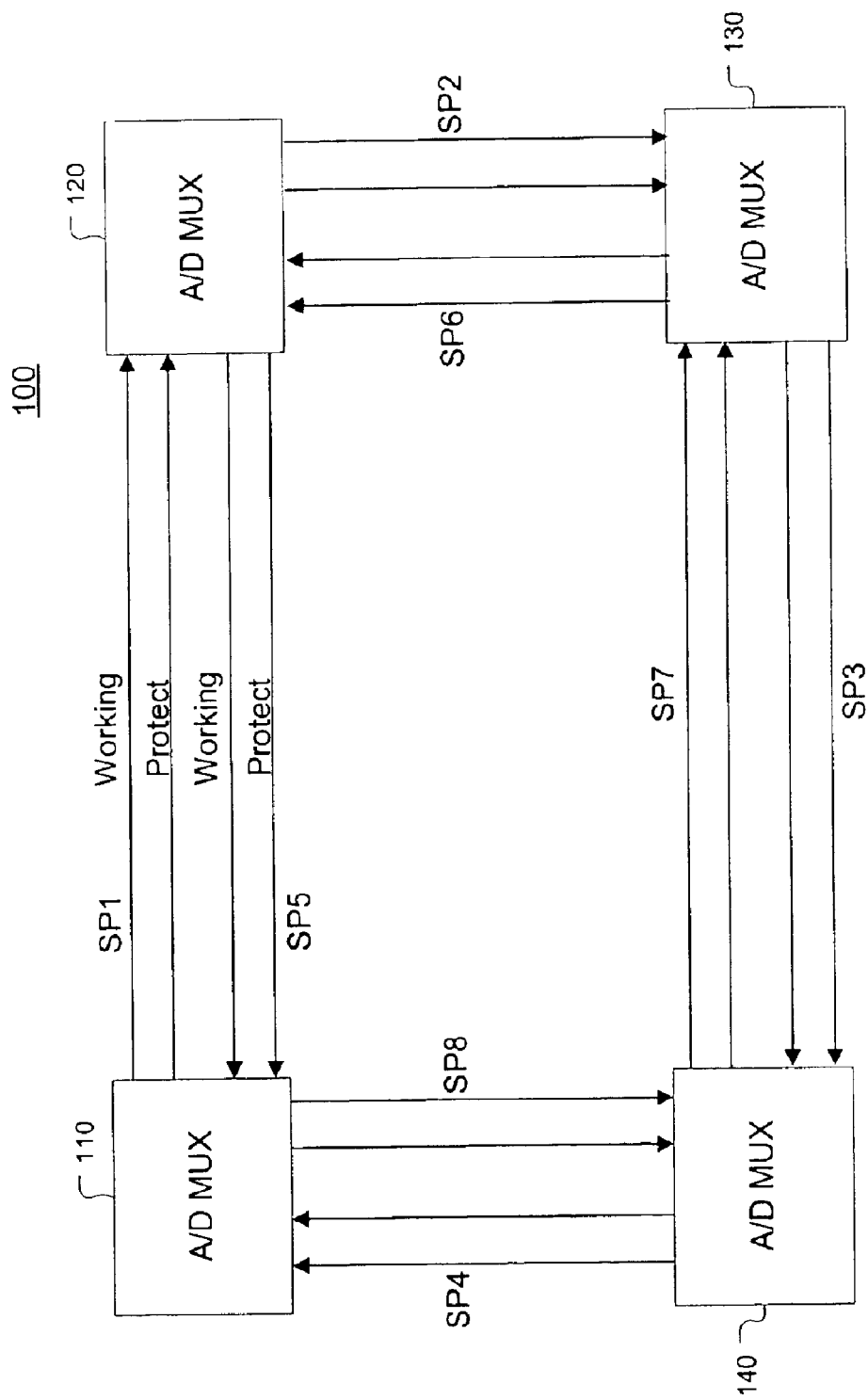
FIG. 2 is a block diagram of a conventional SONET bidirectional ring capable of performing protection switching on a line or span basis.
Figure 3:
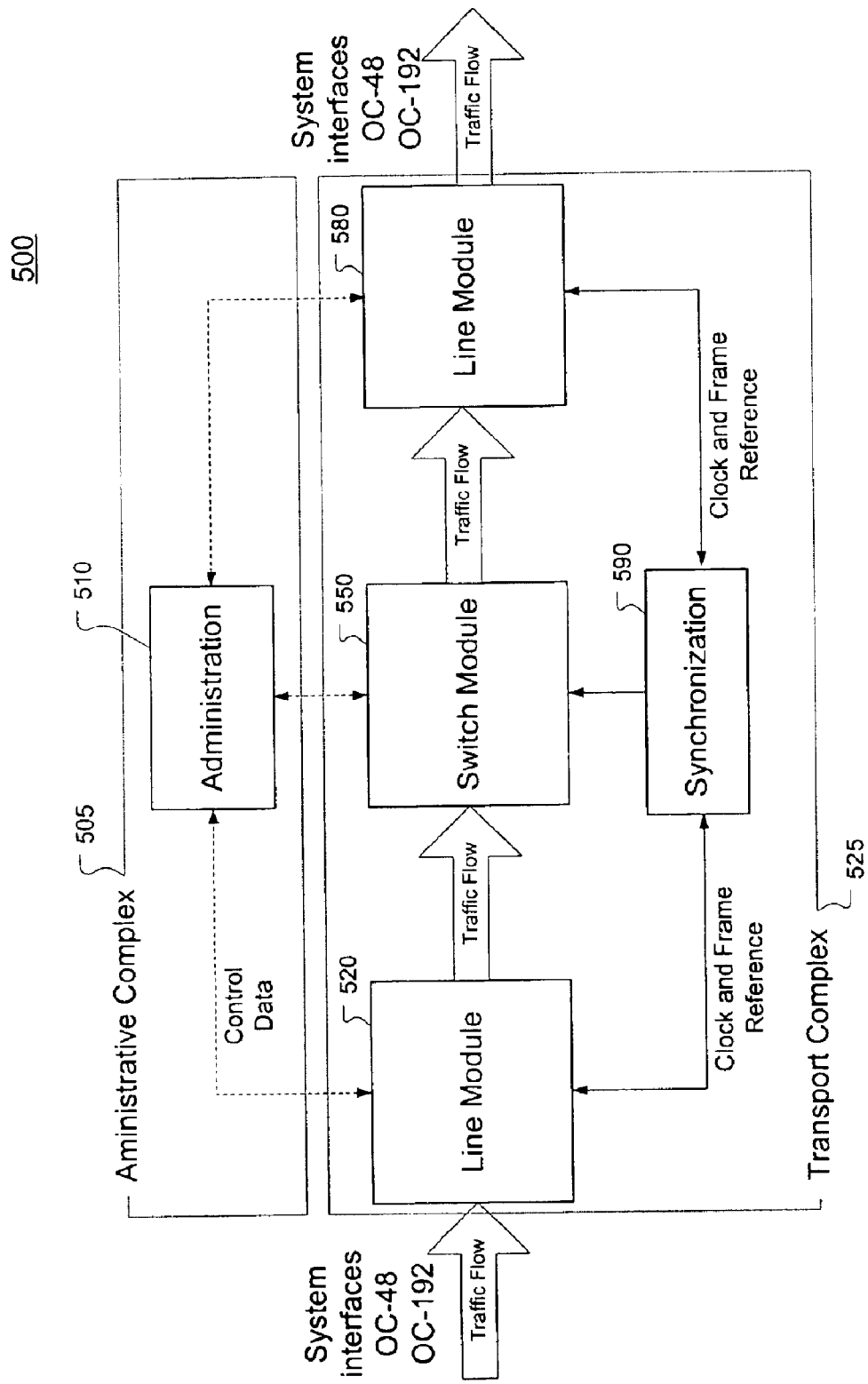
FIG. 3 is a block diagram of the inventive optical cross connect architecture.

The inventive optical cross connect is also termed a Metropolitan Optical Switch (MOS) platform and is, essentially, an STS-1 based cross-connect platform. The basic architecture consists of 16 line interface modules that all connect to 2 redundant switch modules via a backplane. FIG. 3 shows the block diagram of the MOS platform 500.

The MOS platform 500 can be logically separated into two distinct blocks: the Administrative complex 505, and the Transport complex 525. The Administrative complex 505 is used for control and communication of the system and the Transport complex 525 is used for processing the SONET traffic.

The Transport complex 525 is comprised of line modules 520 & 580 and switch modules 550. The representation in FIG. 3 is used to describe the logical flow of SONET data within the system. The primary function of a line module is to serve as an optical to electrical conversion mechanism and to serve as a SONET interface to the outside world. The line module also serves as a framer/pointer processor which retimes and reframes incoming data to the local system timing. A third function of the line module is to extract signal errors on the incoming and outgoing data. The SONET traffic, once processed by the above functions, is then sent electrically to the switch module via a backplane that interconnects the modules. The traffic is transmitted in STS-48 signal format. STS-48 is the electrical equivalent to OC-48

Figure 5:
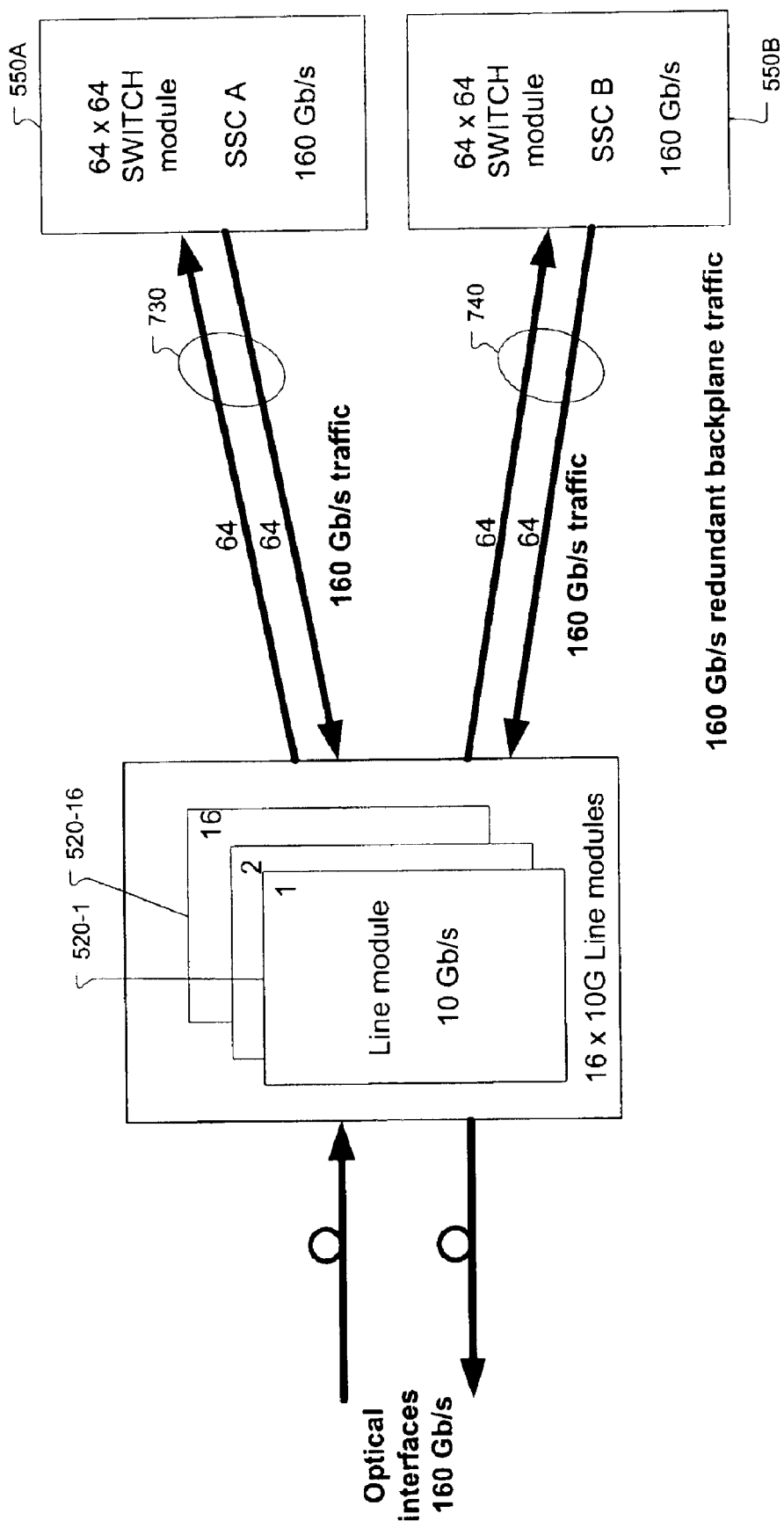
FIG. 5 is a block diagram of I/O modules and redundant switch module architecture according to the invention.

The switch module 550, receives the STS-48 signal and performs STS-1 cross connections as required by the end user. The switch module's main task is to perform cross connections and to serve as a timing source for the system. Once the grooming and switching (cross connects) are complete, the switch module 550 then retransmits the signal in STS-48 format to the line module 580. FIG. 3 shows line modules 580 and 520 to be separate entities but this is not necessarily the case (e.g. the same line module can serve input and output functions as illustrated in FIG. 5). Also, FIG. 3 shows only one switch module 550 and a single egress STS-48 steam for the sake of clarity. In the preferred implementation there are two switch modules for equipment redundancy each outputting duplicate copies of the STS-48 stream to the line modules (See FIG. 6). FIG. 3 is used to describe the basic logical flow of the SONET traffic in the system.

Figure 4:
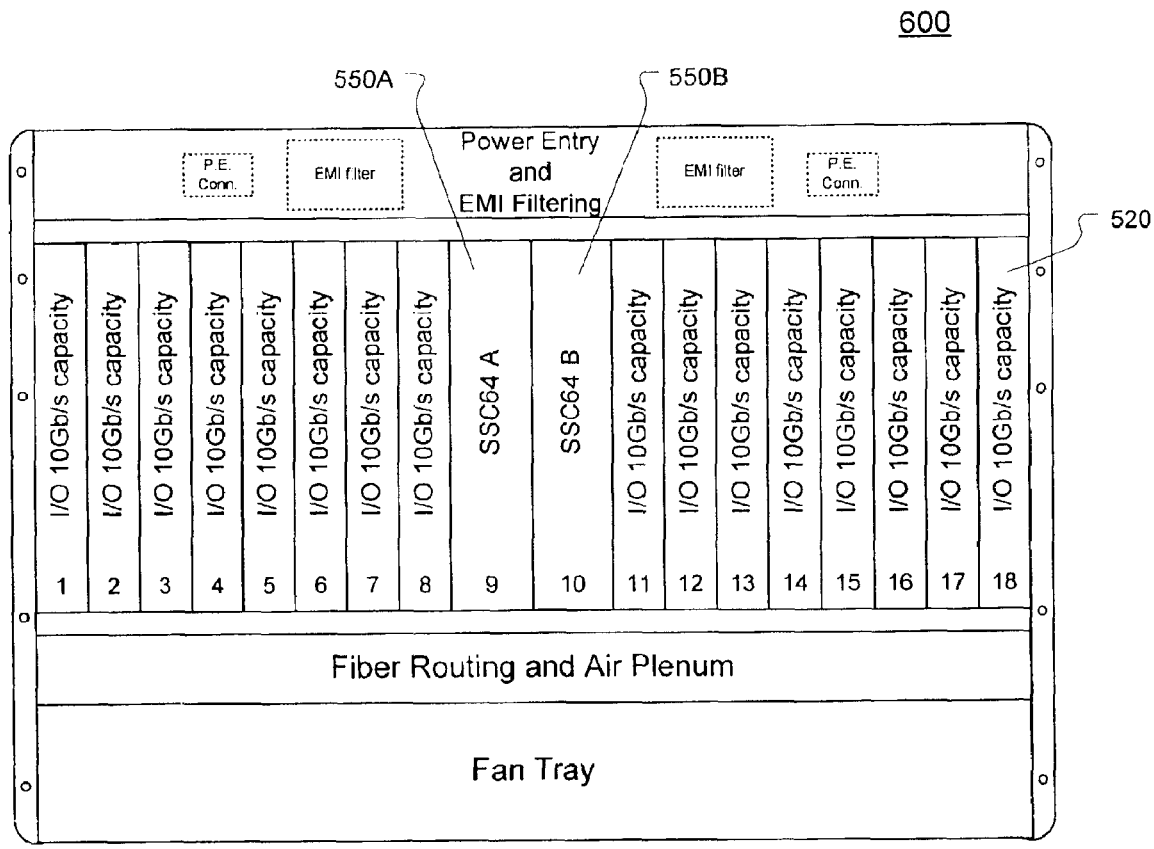
FIG. 4 is a mechanical representation of the inventive optical cross connect hardware.

FIG. 4 shows the physical implementation 600 of the MOS 500. The MOS 500 is a NEBS compliant card cage system into which 18 circuit packs can be inserted. Out of the 18 slots, the two center slots (9 & 10) are Switch modules 550A, 550B. The remaining slots are equipped with Line modules 520.

As shown in FIGS. 4 and 5, the invention utilizes two Switch modules 550A, 550B for equipment redundancy. Each Switch module performs the exact same task its mate. In real time operation, a primary Switch module will be operational while the other remains in standby mode to assume control in case the primary one fails in some way. This scheme is referred to as Master/Slave operation and does not rely on the "left" or "right" modules as Master. Instead, the Master may be logically designated via software.

All other slots in the MOS implementation 600 are line modules 520 (slots 1–8 and 11–18). All Line modules 520 are electrically connected to both Switch modules 550A, 550B via a backplane that spans the width and height of the card cage. Each Line module 520 duplicates its SONET output to direct one copy to one Switch module 550A and a second copy the other Switch module 550B.

FIG. 5 shows a total of 16 Line modules 520-1, 520-16 that transmit and receive 4×STS-48 signals to and from each Switch module 550A, 550B. Thus, each Switch module receives and sends 16×4=64 STS-48 signals 730, 740.

Figure 8:
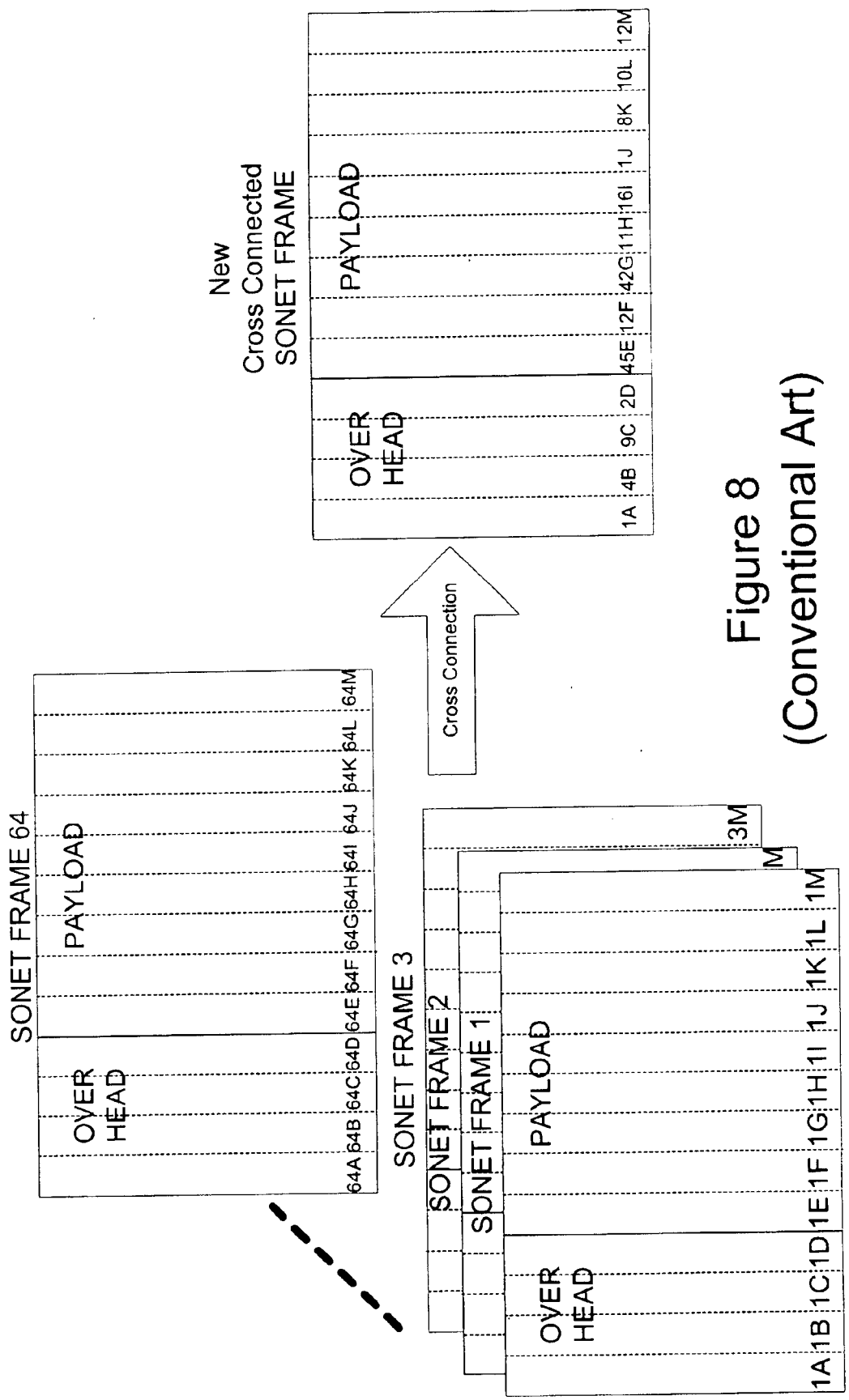
FIG. 8 is a graphical representation of SONET frames and how they are conventionally multiplexed in a STS-1 based cross-connect.

The main function performed by the MOS 500 is SONET STS-1 grooming and switching. In one embodiment, the MOS column grooming switch accepts 64 OC-48 inputs and generates 64 OC-48 outputs (or 16 OC-192s that are de-multiplexed 1:4 within the system). FIG. 8 shows the basic concept of a conventional STS-1 based cross-connect (a.k.a. column grooming) switch. SONET frames can be visualized as a table of columns. Each column represents a STS-1 within a STS-48. The switch is able to create a new frame by selecting any column from any of the 64 inputs. Thus, it allows each STS-1 component of each input stream to be directed to an arbitrary STS-1 slot in an arbitrary output stream. More accurately, the MOS is a 3072 (48*64) by 3072 (48*64) switch at a STS-1 granularity. The MOS can either be used in SONET or SDH or a combined environment. For SDH mode, the granularity of the switching is STM-1.

Protection Switching

Figure 7:
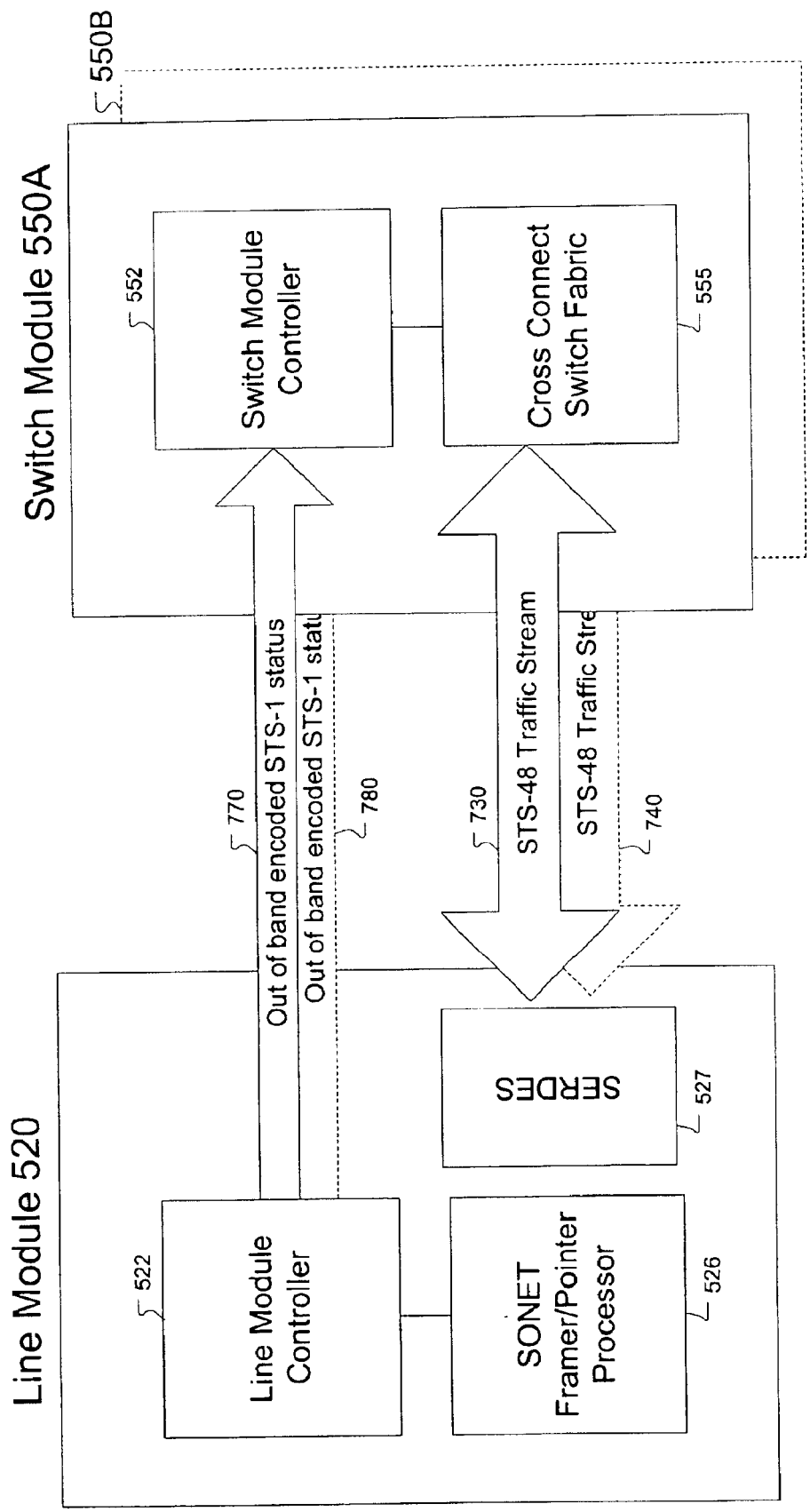
FIG. 7 is a more detailed block diagram of a single line module and switch module architecture that further illustrates the out-of-band communication link between the line module and the switch module according to the invention.

SONET protection typically requires line module redundancy and equipment protection requires switch card redundancy. As shown in FIG. 5, each STS-48 stream originating from a line module 520 is duplicated and transmitted to both switch modules 550A, 550B. This may be done, as shown in FIG. 7, with a backplane SERDES 527 (serializer/deserializer) ASIC that is used at the ingress output (to the backplane) to duplicate the SONET stream to send one copy to each switch module 550A.B.

As described above, both switch modules 550A, 550B perform identical switching and grooming tasks and return the groomed STS-48 streams back to the line modules 520. Using the same SERDES 527 ASIC, the line module 520 then performs best copy selection between the two redundant streams from the switch modules. This best copy selection is based on the better SONET B1 byte of the two and is performed automatically at the end of a each frame by the SERDES 527. This type of equipment protection is performed to protect against switch module failure (e.g. equipment protection).

Path Level Protection Switching

The SONET UPSR (Unidirectional Path Switching Ring) (Telcordia GR-1400-CORE October 1995) protection switching topology is defined to protect each STS-1 within the OC-XXx stream as follows:

"A UPSR, defined in this GR, provides redundant bandwidth to protect services against node failures or other failure conditions. UPSRs operate by bridging (at the entry node) an identical SONET Synchronous Transport Signal (STS) or Virtual Tributary (VT) path signal in both directions around the ring, and then selecting (at the exit node) the better of the two signals to drop from the ring, based on a signal quality hierarchy."

For the MOS 500 to meet this requirement, the platform must have the ability to monitor each STS-1 within all 64 STS-48 streams and perform a best copy selection before outputting back the stream. Due to the high level of integration of the MOS 500 platform, a new technique had to be developed to perform this task and meet the above mention Telcordia requirement. This technique is named Out of Band Signaling In essence this requires the MOS Switch module 550 to process (64×48) 3072 STS-1s per SONET frame (8 khz or 125 us) and make the complete protection switch within a 30 ms time span. The traditional method of performing this task is to use interrupt driven software. Due to the high density and capacity of the MOS, this requires a considerable amount of processing power. Calculations will clearly show that interrupt driver software would require a processor far more powerful then conventional controller. This would increase the cost considerably make the system unmarketable.

Out of Band Signaling

The MOS cross-connect 500 implements this protection switching using a hardware-based architecture to realize this task in real time. This architecture is based on a real time performance monitoring of each STS-1 by the framer 526 ASIC on the Line module 520 and transmitting this information to the Switch module 550 via a switch module controller 552 that may be implemented with an FPGA. The Line module controller 522 encodes a status byte per STS-1 based on various defects. These defects, in a SONET implementation, include B3 byte, LOS, AIS-P, AIS-L, LOF etc . . . The worse the error condition, the higher value is given to the status byte. The Line module processor 522 and switch module controller 552 work together to perform this task. Once the data has been encoded, the line module controller 522 is ready to transmit this information to the Switch module 550.

Figure 6:
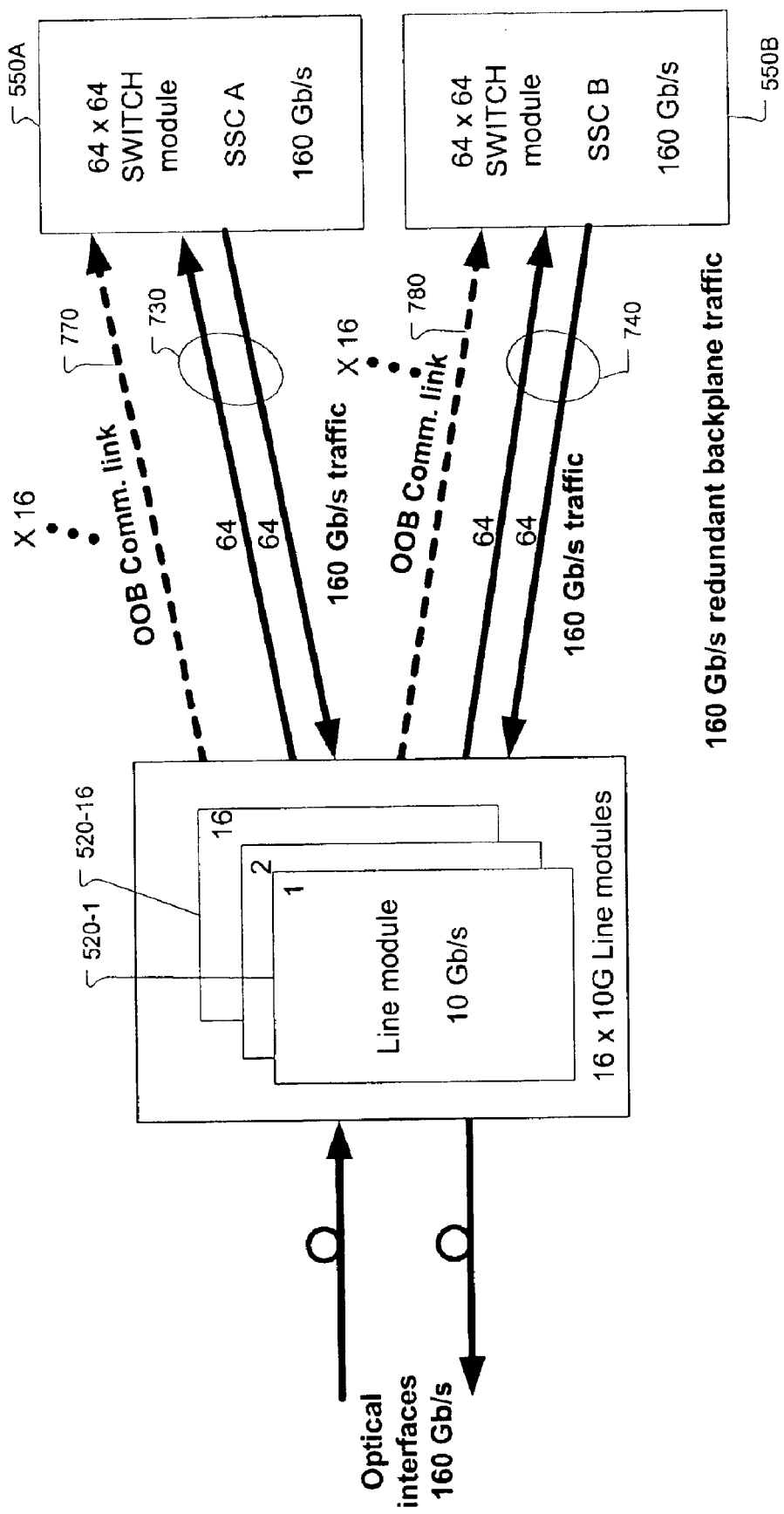
FIG. 6 is another block diagram of I/O modules and redundant switch module architecture and further illustrating the out-of-band communication link between the I/O modules and the switch modules according to the invention.

To implement a real time transfer of information between the Line modules 520 and Switch modules 550A, a proprietary communication channel was implemented. FIG. 6 shows the dedicated, proprietary communication channel 770 from the Line modules 520 to the Switch modules 550 (also shown in FIG. 7). This channel 770 operates at, for example, a 19 Mhz data rate and is driven by the Line module controller 522. On the other end, the proprietary communication channel 770 is received by the Switch module controller 552. Each of these controllers 522, 552 may be implemented using an FPGA. For the sake of clarity, FIG. 5 shows a single Line module 520 and Switch module 550 and associated transmission links. The actual system has 16 line modules 520-1 through 520-16 connected to each of the redundant switch modules 550A, 550B. Thus, each line module 520 has two proprietary communication channels 770, 780 for communicating the OOSB information to both of the switch modules 550A, 550B.

On the receive side, the Switch module controller 552 on the Switch module 550 receives the OOBS STS-1 status information along with all the STS-1 status information of all 16 Line modules. In total, the switch module controller 552 will receive 3072 STS-1 status information bytes.

Based on this information, the switch module controller 552 then processes a protection switching algorithm to decide which STS-1 to send back to the line module 520. The algorithm basically compares the two STS-1 status bytes the user has predefined as "working" and "protect" and decides which of the two is has a better status. Once this has been decided, the switch module controller 552 makes the appropriate configuration in the cross connect fabric 555. This in turn will make the appropriate switch. This process occurs within the 30 ms time frame allocated to SONET protection switching schemes and is performed every 125 us.

The reason the architecture is referred as "Out of Band Signaling or OOBS" is due to the fact that the status information is sent along in parallel (via OOBS channels 770, 780) to the SONET traffic stream 730, 740 and not within the SONET stream.

Figure 9:
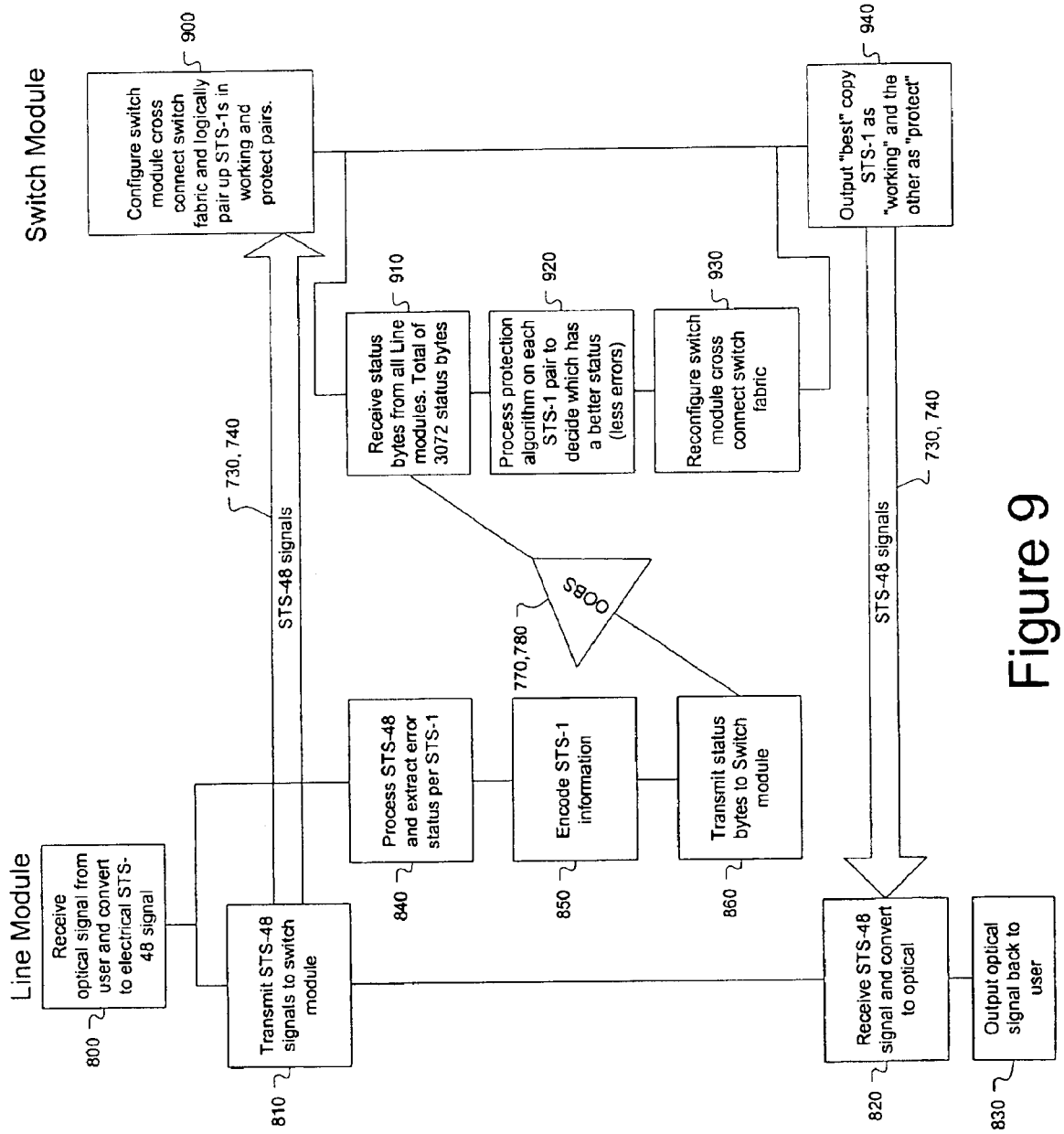
FIG. 9 is a flow chart of the inventive processes performed by the Line module and Switch module during real-time operation.

FIG. 9 shows the flow chart of processes that occur between the line and modules 520, 550 in real time. As shown therein, the line module receives (800) an optical signal from a user (e.g. via an optical network such as a carrier network) and converts the optical input signal to an electrical signal. In the example given, the electrical signal is at the STS-48 rate. The electrical signal is then transmitted (810) to the switch module 550 (preferably to both switch modules 550A, 550B). The line module also processes the electrical signal (STS-48) to extract (840) error status information for each STS-1 within the higher-rate STS-48 which may be specifically performed by the framer 526. The STS-1 level error status information is passed to the line module controller 522 which encodes (850) the STS-1 error status information and transmits (860) this information to the switch module 550 via the OOBS channel 770.

Meanwhile, when the switch module 550 receives the STS-48 data being transmitted (810) by the line module 520. The switch module controller 552 may then configure (900) the cross connect switch fabric 555 and logically pair up STS-1s in working and protect pairs.

The switch module controller 552 also receives (910) the status bytes (total of 3072 such bytes in the implementation example given here) via the OOBS channels 770 from all of the line modules 520. It may then process (920) a protection algorithm on each STS-1protect/working pair to decide which one has the better status (e.g. less errors). Based on the results of this process (920), the switch module controller 552 reconfigures the switch module cross connect fabric 555. The switch fabric 555 may then output (940) the best STS-1 from among the protect/working pair as the working STS-1 and the other as the protect STS-1. These STS-1s are put into an STS-48 sized payload and sent back to the line module as indicated. The line module receives (820) this STS-48 data stream and converts it into an optical signal which may then be output (830) back to the user.

In conventional cross connect systems, line and path protection switching is processed at the Line module level. Basically adjacent two cards compare their mates signal against theirs and perform protection switching on them. This process limits the user to having to pair "working" and "protect" fiber in adjacent slots in the system. (ADM-192 scheme). A significant achievement of the inventive architecture and methods is that they removes the limitation of having working and protection fibers in two dedicated adjacent slots. Along with this, the MOS 500 is able to protect any STS-1 with any STS-1 in the system regardless of physical slot location. The MOS system 500 explained above is defined as a "centralized protection switching" system where the protection occurs at the Switch level as opposed to the Line level.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A signaling architecture for a cross connect switch including line modules having in-band payload data connections to at least one switch module, each of the line modules including a framer and at least some of the framers receiving a high rate signal with payload data and status information, the payload data being sent to the switch module via the in-band payload data connections, the signaling architecture comprising:

out-of-band communication channels operatively connected between each of the line modules and the at least one switch module, said out-of-band communication channels being separate from the in-band payload data connections;

a line module controller associated with each of the line modules and operatively connected to the corresponding framer, said line module controller receiving status information from the corresponding framer for each low rate signal contained within the high rate signal;

said line module controllers transmitting the status information to the switch module via said out-of-band communication channels;

said switch module receiving the status information from said line module controllers via said out-of-band communication channels, wherein the switch module includes a switch module controller, said line module controllers transmitting the status information to the switch module controller of the switch module via said out-of-band communication channels;

said switch module controller receiving the status information from said line module controllers and making switching decisions based on the status information received via said out-of-band communication channels, wherein the status information is extracted from overhead data in the high rate signals being received by the framers, wherein the high rate signal being received by the framers is a SONET-compliant or SDH-compliant signal, wherein the status information includes LOS (Loss Of Signal), LOF (Loss of Frame), LOP (Loss of Pointer), K1, K2, B1, and/or B3 bytes.

2. The signaling architecture according to claim 1, wherein the high-rate signal is an STS-48 signal and the low-rate signal is an STS-1 signal.

3. The signaling architecture according to claim 1, wherein the switch module includes a first switch module and a second switch module, said out-of-band communication channels operatively connected between each of the line modules and both the first and second switch modules;

said line module controllers transmitting the status information to both the first and second switch modules via said out-of-band communication channels; and said first and second switch modules receiving the status information from said line module controllers via said out-of-band communication channels.

4. The signaling architecture according to claim 1, said switch module controller logically pairing low-rate signals derived from high rate signals received via different line modules into working/protect pairs.

5. The signaling architecture according to claim 4, said line module controllers transmitting the status information to the switch module controller of the switch module via said out-of-band communication channels;

said switch module controller receiving the status information from said line module controllers and deciding which of the low rate signals of each working/protect pair will be a working low rate signal and which will be a protect low rate signal based on the status information.

6. The signaling architecture according to claim 4, wherein the line modules from which the logical working/protect pairing is derived are not contiguous line modules.

7. The signaling architecture according to claim 1, wherein the high-rate signal is an STS-N signal and the low-rate signal is an STS-1 signal.

8. A signaling architecture for a cross connect switch including line modules having in-band payload data connections to at least one switch module, each of the line modules including a framer and at least some of the framers receiving a high rate signal with payload data and status information, the payload data being sent to the switch module via the in-band payload data connections, the signaling architecture comprising:

out-of-band communication channels operatively connected between each of the line modules and the at least one switch module, said out-of-band communication channels being separate from the in-band payload data connections;

a line module controller associated with each of the line modules and operatively connected to the corresponding framer, said line module controller receiving status information from the corresponding framer for each low rate signal contained within the high rate signal;

said line module controllers transmitting the status information to the switch module via said out-of-band communication channels;

said switch module receiving the status information from said line module controllers via said out-of-band communication channels;

said line module controllers encoding the status information for each low rate signal contained within the high rate signals before transmitting the encoded status information to the switch module via said out-of-band communication channels.

9. A signaling method for a cross connect switch including line modules having in-band payload data connections to at least one switch module, each of the line modules including a framer and at least some of the framers receiving a high rate signal with payload data and status information, the payload data being sent to the switch module via the in-band payload data connections, the signaling method comprising:

receiving status information from the corresponding framer for each low rate signal contained within the high signal;

transmitting, from the line modules, the status information to the switch module via out-of-band communication channels provided between each of the line modules and the at least one switch module, the out-of-band communication channels being separate from the in-band payload data connections;

receiving, at the switch module, the status information from the line module via the out-of-band communication channels; and logically pairing low-rate signals derived from high rate signals received via different line modules into working/protect pairs.

10. The signaling method according to claim 9, further comprising:

making switching decisions based on the status information received by the switch module via the out-of-band communication channels.

11. The signaling method according to claim 10, wherein the status information is extracted from overhead data in the high rate signals being received by the framers.

12. The signaling method according to claim 11, wherein the high rate signal being received by the framers is a SONTET-compliant or SDH-compliant signal, and wherein status information includes LOS (Loss Of Signal), LOF (Loss of Frame), LOP (Loss of Pointer), K1, K2, B1, and/or B3 bytes.

13. The signaling method according to claim 12, wherein the high-rate signal is an STS-48 signal and the low-rate signal is an STS-1 signal.

14. The signaling method according to claim 9, further comprising encoding the status information for each low rate signal contained within the high rate signals before transmitting the encoded status information to the switch module via the out-of-band communication channels.

15. The signaling method according to claim 9, further comprising:

deciding which of the low rate signals of each working/protect pair will be a working low rate signal and which will be a protect low rate signal based on the status information.

* * * * *